US005524824A

United States Patent [19]

[11] Patent Number: 5,524,824

Frimmer

[45] Date of Patent: Jun. 11, 1996

[54] SPRINKLER SHUT-OFF VALVE AND INDICATOR

[76] Inventor: Elliot M. Frimmer, 1749 SW. 81st Terrace, Davie, Fla. 33324

[21] Appl. No.: 319,121

[22] Filed: Oct. 6, 1994

[51] Int. Cl.[6] .............................. F16K 37/00; F17D 3/00

[52] U.S. Cl. .............................. 239/71; 239/200; 239/201; 239/569; 137/556; 116/277; 116/283

[58] Field of Search .............................. 239/71, 73, 200, 239/201, 569, 570, 204; 137/68.1, 556, 553; 116/281, 283, 277

[56] References Cited

U.S. PATENT DOCUMENTS

| | | | |
|---|---|---|---|
| 1,432,386 | 10/1922 | Curney . | |
| 2,654,338 | 10/1953 | Deal | 116/283 |
| 2,768,027 | 10/1956 | Nelson | 137/556 |
| 4,141,310 | 2/1979 | Rich, Jr. | 116/227 |
| 4,562,962 | 1/1986 | Hartman | 239/569 |
| 4,736,889 | 4/1988 | Stephenson . | |
| 4,825,897 | 5/1989 | Shade . | |
| 4,842,198 | 6/1989 | Chang . | |
| 4,848,661 | 7/1989 | Palmer et al. | 239/204 |
| 5,174,500 | 12/1992 | Yianilos | 239/201 |
| 5,335,857 | 8/1994 | Hagon | 239/570 |
| 5,373,989 | 12/1994 | Hattori | 239/71 |

*Primary Examiner*—Karen B. Merritt
*Attorney, Agent, or Firm*—Lott & Friedland

[57] ABSTRACT

A shut-off valve, for use with a sprinkler head affixed to a riser pipe, including a valve seat affixed within the riser pipe upstream from the sprinkler head, the valve seat having an opening and impeding flow through said riser except through the opening. A movable valve element is located within the riser pipe upstream from the valve seat, the valve element being movable between an open position, in which it is spaced apart from the valve seat, and a closed position, in which it engages the valve seat to close the opening and impede fluid from flowing through the riser pipe. A spring biases the valve element toward the valve seat, and a perforated tube extends from the valve element through the opening in the valve seat and contacts the sprinkler head to maintain the valve element in its open position. Whenever the sprinkler head becomes dislodged from the riser pipe, the spring moves the valve element downstream into its closed position, and forces the perforated tube to extend out from an outlet of the riser pipe. Optimally, the perforated tube is brightly colored with a flag connected thereto so as to provide the most effective alerting means.

15 Claims, 2 Drawing Sheets

SPRINKLER SHUT-OFF VALVE AND INDICATOR

TECHNICAL FIELD

The present invention relates generally to a shut-off valve for sprinkler systems and more particularly to a valve which shuts off the water flow through a sprinkler outlet and signals when the sprinkler head has become dislodged.

BACKGROUND OF THE INVENTION

In a typical sprinkler system, a single water source supplies water simultaneously to several sprinkler outlets, interconnected by a network of underground supply pipes. Generally, at each outlet, a vertical riser pipe extends upward from a T-fitting or elbow in the supply pipe to the surface, where it is capped by a sprinkler head.

When designing a sprinkler system to spread water over a specified area, the water pressure, water flow volume, and the number, placement and type of sprinkler heads must all be considered. If a sprinkler head becomes dislodged, the system will generally not function properly. First, the water flow through that particular outlet will increase dramatically due to the reduced resistance. Second, this increased flow will not be dispersed, often causing localized flooding or erosion. Third, the water flow to the remaining outlets will be diminished, causing incomplete watering by the remainder of the circuit.

Therefore, it would be beneficial to have a mechanism which would shut off the water flow through an outlet from which the sprinkler head has become dislodged. This would prevent the increased, undispersed flow through that particular outlet, as well as the decreased water flow through the remaining sprinklers.

Specific .mechanisms have been designed to automatically shut off the flow of water through a sprinkler outlet in the absence of a sprinkler head. Generally, the existing mechanisms rely upon hydraulic pressure-the local increase in water flow due to the missing sprinkler head-to close a valve, thereby shutting off water flow through the outlet.

For example, both U.S. Pat. No. 1,432,386 to Curney ("the '386 patent") and U.S. Pat. No. 5,174,500 to Yianilos ("the '500 patent") describe devices which employ valves held open by physical contact with the sprinkler head. In each of these devices, a valve seat is located downstream of a valve element. The downstream flow of the valve element is impeded by the presence of the sprinkler head. When the sprinkler head becomes dislodged, the valve element is forced by the flow downstream until it closes the valve. The water pressure behind the valve keeps the valve element closed.

U.S. Pat. No. 4,736,889 to Shephenson ("the '889 patent") and U.S. Pat. No. 4,842,198 to Chang ("the '198 patent") both describe devices in which the valve is held open by a spring which is calibrated to overcome the normal flow through the outlet when the sprinkler head is in place. In these devices, the valve is again shut by the increased local water flow at the outlet when a sprinkler head becomes dislodged. In these cases, the increased flow overcomes the resistance provided by the spring and closes the valve.

U.S. Pat. No. 4,825,897 to Shade ("the '897 patent") describes a device, for use in vertical riser pipes, employing a weighted spherical valve member which is calibrated to float in the housing of the valve during normal flow conditions. When the sprinkler head becomes dislodged, the increased flow forces the sphere up, against the force of gravity, so that the sphere closes the valve.

One major disadvantage of the above-described systems is that each of these devices rely upon hydraulic forces to close the valve. Nothing holds the valve closed when the water pressure behind the valve is discontinued. This is especially problematic when it is desirable to provide the system with a mechanism to signal that a sprinkler head has been dislodged.

The mechanism described in the '500 patent and the '889 patent each allow for a continued, but greatly reduced, stream of water through the outlet when the sprinkler head is dislodged, and this stream can act to signal the absence of the sprinkler head. This stream will, however, cease when the water flow is terminated. Therefore, these devices do not provide an adequate signal when the water is not flowing.

Accordingly, there is a need for an improved sprinkler valve which will automatically seal a sprinkler outlet should the sprinkler head become dislodged, and will retain its seal regardless of whether the water is flowing in the system. There is an additional need for such an improved valve to include a means for signaling the absence of a sprinkler head at the outlet even in the absence of water flow. It would be particularly helpful if the indicator would work regardless of whether water was flowing through the system, so that it could be inspected and repaired without having the water flowing. This problem is not an obvious one, and none of the cited patents even recognizes it.

SUMMARY OF THE INVENTION

The invention provides a device for automatically sealing an outlet when a sprinkler head becomes dislodged and retaining the seal regardless of whether the water is flowing in the system. The invention further provides a signal which will indicate the absence of the sprinkler head regardless of whether the water is flowing.

Broadly stated, the present invention provides a shut-off valve, for use with a sprinkler head affixed to a riser pipe, including a valve seat affixed within the riser pipe upstream from the sprinkler head, the valve seat having an opening, the valve seat impeding flow through said riser except through the opening. A movable valve element is located within the riser pipe upstream from the valve seat, the valve element being movable between an open position, in which it is spaced apart from the valve seat, and a closed position, in which it engages the valve seat to close the opening and impede fluid from flowing through the riser pipe. A spring biases the valve element toward the valve seat, and a perforated tube extends from the valve element through the opening in the valve seat and contacts the sprinkler head to maintain the valve element in its open position. Whenever the sprinkler head becomes dislodged from the riser pipe, the spring moves the valve element downstream into its closed position.

In an alternate embodiment, whenever the valve element is in its closed position, the perforated tube extends out from the outlet of the housing. Also, said perforated tube may be brightly colored to act as a marker. A flag may be affixed at one end to said perforated tube.

An alternate form of the present invention provides a sprinkler outlet with a shut-off valve including a housing having an inlet and an outlet with a sprinkler head affixed to the outlet of the housing. A valve seat is affixed within the housing upstream from the sprinkler head; the valve seat has an opening and impedes flow through the housing except through the opening. A movable valve element is located within the housing upstream from the valve seat, the valve element being movable between an open position, in which the valve element is spaced apart from the valve seat, and a closed position, in which the valve element engages the valve seat to close the opening and impede fluid from flowing through the housing. A spring biases the valve element toward the valve seat. A perforated tube extends from the valve element through the opening in the valve seat and contacts the sprinkler head to maintain the valve element in its open position. Whenever the sprinkler head becomes dislodged from the housing, the spring moves the valve element downstream into its closed position.

In an alternate embodiment, whenever the valve element is in its closed position, the perforated tube extends out from the outlet of the housing. Also, said perforated tube may be brightly colored to act as a marker. A flag may be affixed at one end to said perforated tube.

In an alternate embodiment, the present invention provides a sprinkler outlet with a shut-off valve including a supply pipe, a T-fitting having a first outlet a second outlet, and an inlet affixed to he downstream end of the supply pipe, a cap affixed to the second outlet, and a sprinkler head affixed to said first outlet. A stationary valve seat is disposed within the T-fitting substantially near the first outlet, the valve seat having an opening. A movable perforated tube is disposed within the T-fitting and through the opening, having a downstream end and an upstream end. The downstream end contacts the sprinkler head, and the upstream end is sealed. A shoulder is on said perforated tube upstream of said valve seat, forming a valve element for engagement with the valve seat. A compressed spring is affixed at one of its ends to the upstream end of the perforated tube and affixed at its other end to the cap, biasing the downstream end of the perforated tube against the sprinkler head. Whenever the sprinkler head becomes dislodged from the first outlet, the spring forces the perforated tube downstream such that the shoulder engages the valve seat to shut off water flow through the first outlet.

In an alternate embodiment, whenever the shoulder engages the valve seat, the perforated tube extends out from the first outlet. The rod may be brightly colored to act as a marker. Also, a flag may be affixed at one end to said perforated tube.

Accordingly, it is an object of the present invention to provide a sprinkler outlet valve which will shut automatically should the sprinkler head become dislodged.

It is a further object of the present invention to provide a valve with a mechanism for signaling the absence of a sprinkler head from the outlet.

It is a further object of the present invention to provide a signaling mechanism which will remain activated regardless of whether the water pressure is on in the system.

These and other objects, features, and advantages of the present invention may be more clearly understood and appreciated from a review of ensuing detailed description of the preferred and alternate embodiments and by reference to the accompanying drawings and claims.

BRIEF DESCRIPTION OF THE DRAWINGS

FIG. 5(*b*) is a perspective view of an alternate embodiment of the stem of the present invention.

DETAILED DESCRIPTION OF THE PREFERRED EMBODIMENT

Figure 1:
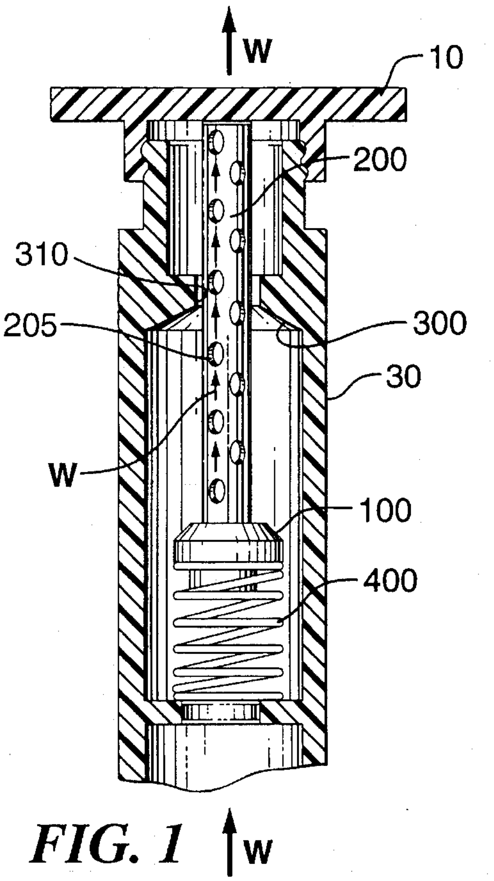
FIG. 1 is a schematic of the present invention in its normal operating position.

FIG. 1 shows a schematic of the invention in normal flow conditions. A sprinkler head 10 is affixed to a housing, such as a riser pipe 30. Water flows through the system in the direction indicated by arrows W. A valve seat 300 is positioned within the housing 30 upstream of the sprinkler head 10. The valve seat 300 has an opening 310 through which water can flow. A movable valve element 100 is located upstream of the valve seat 300 in the housing 30. A spring 400 biases the valve element 100 toward the valve seat 300. The valve element 100 is impeded from moving downstream into engagement with the valve seat 300 by a perforated tube 200. The perforated tube 200 extends from the valve element 100 through the opening 310 to contact the sprinkler head 10. This contact blocks the valve element 100 from moving downstream. Because the opening 310 is the only path through which the water can reach the sprinkler head 10, the perforated tube 200 is designed with a plurality of perforations 205 so that it does not unacceptably obstruct flow through the opening 310.

Figure 2:
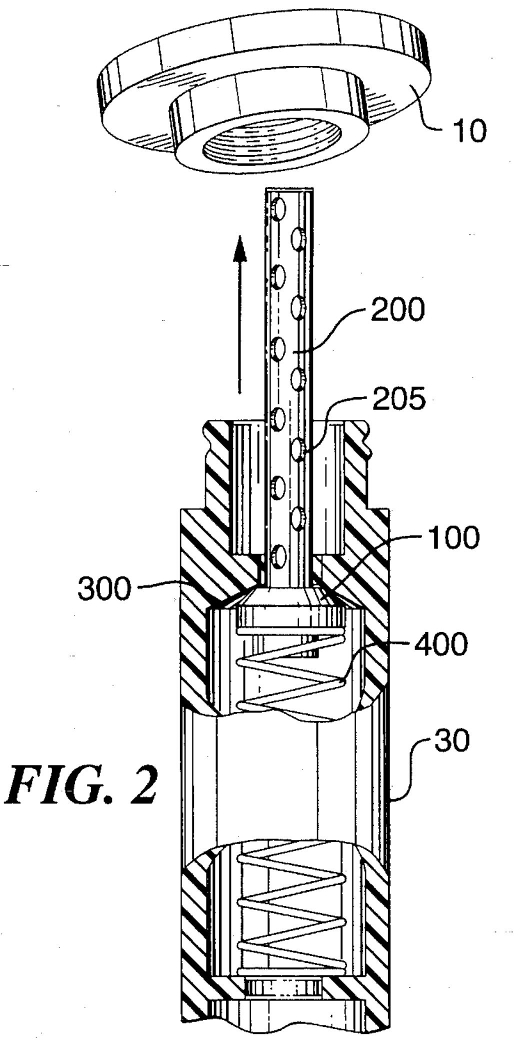
FIG. 2 is a schematic of the present invention in its shut position.

If the sprinkler head were to become dislodged, as shown schematically in FIG. 2, then the valve system would move into its closed position. As can be seen in FIG. 2, the sprinkler head 10 no longer impedes the downstream movement of the valve element 100. Spring 400 forces valve element 100 downstream toward the valve seat 300. If the water is flowing through the system, the flow will also act to force the valve element 100 into its seated position. It is not necessary, however that water be flowing through the system, as the mechanical force exerted by spring 400 alone will close the valve. As the valve closes, perforated tube 200 slides through opening 310 until valve element 100 engages valve seat 300 to close off the flow through the housing 30.

Figure 3:
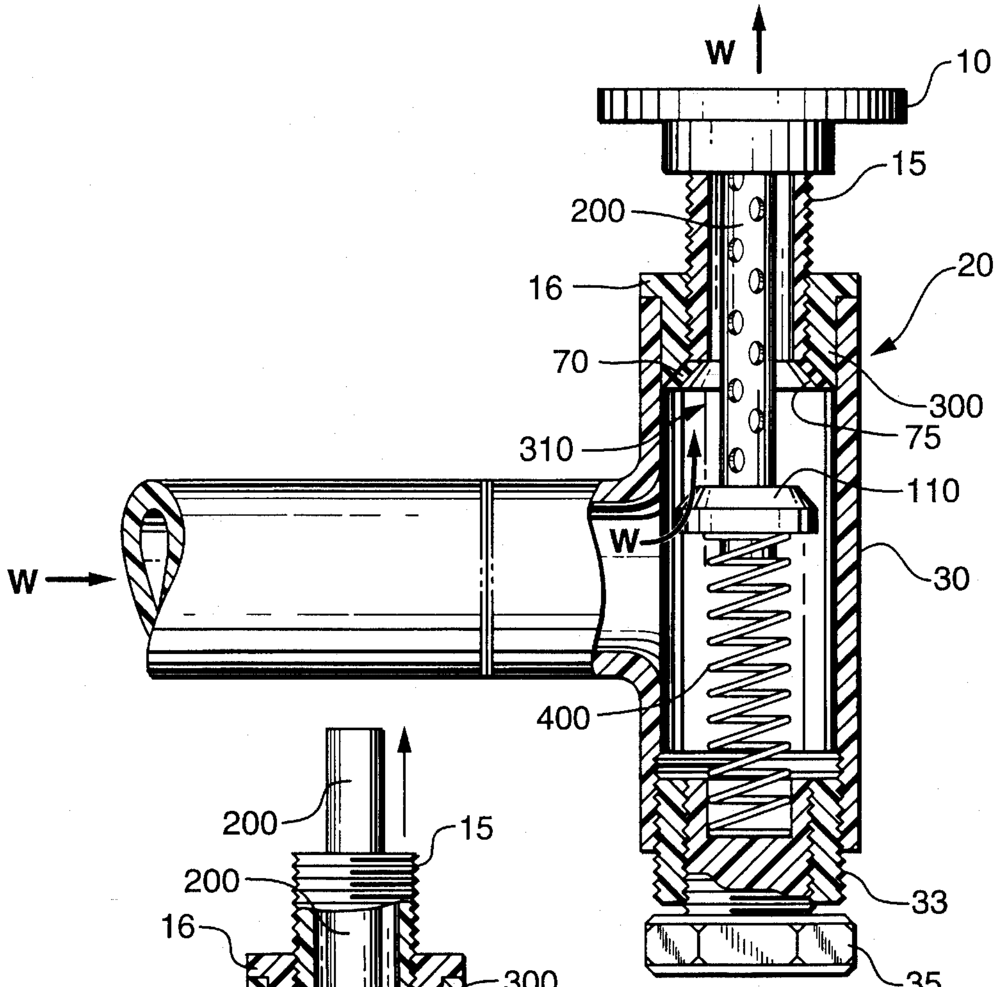
FIG. 3 is a partially cut-away, side view of an embodiment of the present invention in its normal operating position.

In the preferred embodiment of the present invention, shown in FIG. 3, the housing is a riser pipe 30, formed by a T-fitting 20 perpendicular to the supply pipe 50. The riser pipe 30 may alternately be affixed to the supply pipe 50 by any of a number of fittings, including a T-fitting parallel to the supply pipe 50, so that the water could flow past this particular outlet, or an elbow. The system is shown seated in the riser pipe 30, which runs from the supply pipe 50 to the sprinkler head 10. A reducer 16 is secured at the end of the riser 30. A threaded nipple 15 is secured into the reducer 16 so that it extends into and out from the end of the riser 30. The sprinkler head 10 is secured to the top of the nipple 15. Water flow into the perforated tube and through the outlet is shown by arrows W.

A valve seat 300 is affixed in the riser 30 upstream of the sprinkler head 10. In this case, the valve seat 300 is formed on the upstream end of the reducer 16. The shoulder 70 is beveled to provide a better seat. A rubber washer 75 is affixed within the shoulder. The valve seat 300 has an opening 310 to allow water to flow therethrough. Except for the opening 310, the valve seat 300 should form a watertight barricade in the riser 30. Therefore, any water that flows from the supply pipe 50 to the sprinkler head 10 must pass through the opening 310 in the valve seat 300.

Upstream of the valve seat 300 is the movable valve element 100. The valve element 100 has a rubber washer 110 and is designed and positioned to fit into the valve seat 300 to form a seal should the valve element 100 be moved in a downstream direction. When the valve element 100 engages the valve seat 300, the washers 75, 110 will engage one another and seal the opening 310, closing off the riser 30 completely.

A perforated tube 200 extends downstream from the valve element 100. The washer 110 surrounds the base of the perforated tube 200. The perforated tube 200 passes through the opening 310 in the valve seat 300 and contacts the underside of the sprinkler head 10. This perforated tube 200 prevents the valve element 100 from flowing downstream to engage the valve seat 300 and shut off the flow. The perforated tube 200 is designed so that it does not significantly impair the water flow through the opening 310. The water pressure in the system should be calibrated to accommodate whatever restrictions in the water flow, if any, are caused by the presence of the perforated tube 200.

A spring 400 biases the valve element 100 toward the valve seat 300. This, in turn, biases the perforated tube 200 against the underside of the sprinkler head 10. The spring 400 is shown as being affixed at one end to the upstream side of the valve element 100. The other side of the spring 400 is shown to be affixed in a cap 35 in the upstream branch of the T-fitting 20. The cap 35 is affixed to threaded nipple 33, which in turn is disposed in and extends from the T-fitting 20. In this configuration, the spring 400 is compressed during normal operating conditions so that it presses the valve element 100 downstream. The spring 400 may alternatively be positioned downstream of the valve element 100, in which case it would be expanded during normal operation so that it would tend to draw the valve element 100 downstream into contact with the valve seat 300. In any case, the spring 400 is configured so that if the sprinkler head 10 were removed, even in the absence of water flow in the pipes 30, 50, the spring 400 would move the valve element 100 into engagement with the valve seat 300, which would close the opening 310.

Figure 4:
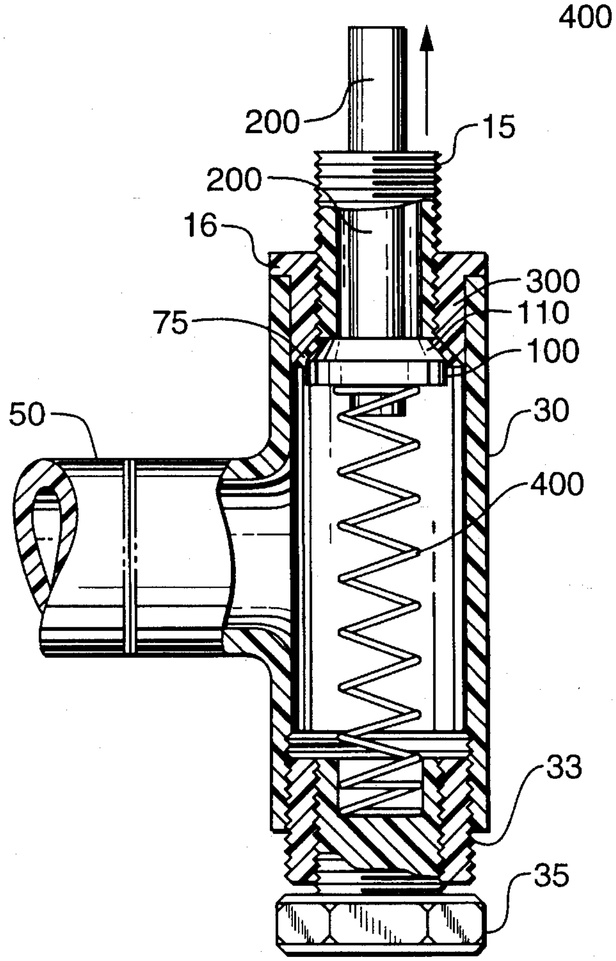
FIG. 4 is a partially cut-away, side view of an embodiment of the present invention in its shut position.

The valve is shown in its closed position in FIG. 4. As the valve element 100 moves into engagement with the valve seat 300, the stem 200 emerges from the end of the riser 30 where the sprinkler head 10 once was. The perforated tube 200 may be brightly colored so that it more prominently indicates the absence of a sprinkler head 10. The distance that the perforated tube 200 extends from the exposed end of the riser 30 will depend upon how far apart the valve element 100 and valve seat 300 are during normal operating conditions with the sprinkler head 10 in place.

In order to facilitate explanation, the system has been illustrated in conjunction with a sprinkler head 10 at the terminus of a supply pipe 50. It is important to note that this is not necessary to the invention. This design may be employed with a sprinkler head 10 located anywhere along the supply pipe 50. The system does not significantly impede the flow of water through the supply pipe 50 to other (downstream) sprinklers regardless of whether the valve is in its open or closed position.

Figure 5A:
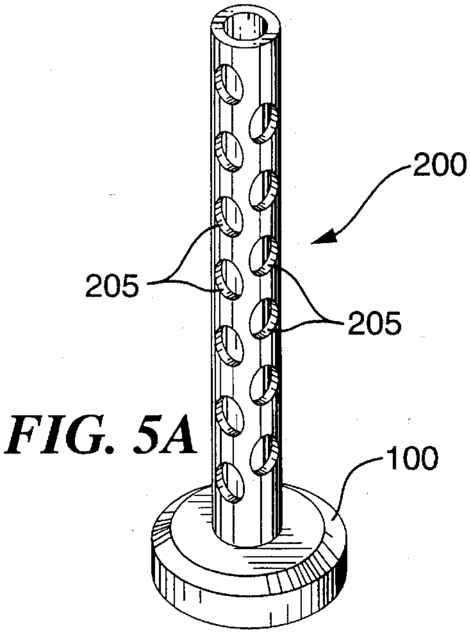
FIG. 5(*a*) is a perspective view of an embodiment of the perforated tube of the present invention.
Figure 5B:
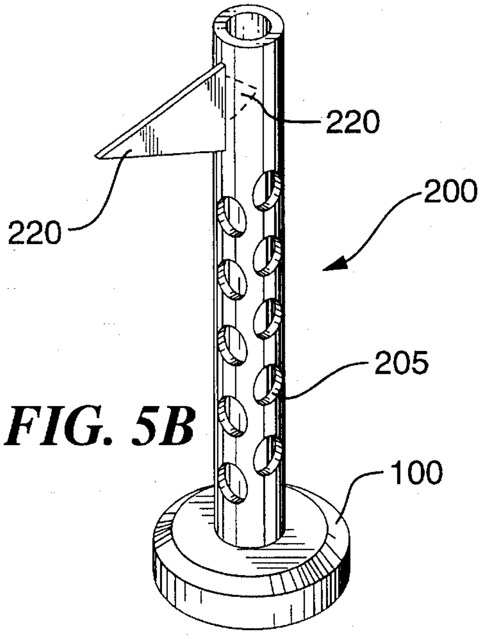

FIG. 5 shows some of the various embodiments of the perforated tube 200 itself. In one embodiment, shown in FIG. 5(*a*), the stem is formed by a hollow tube with holes 205 drilled therein. The holes 205 allow water to enter and flow through the stem 200. The end of the stem 200 which is affixed to the valve element 100 must be sealed to prevent water from flowing therethrough, as this would defeat the seal when the valve is closed.

As an optional feature of the present invention, shown in FIG. 5(*b*), a flag 220 may be disposed near the downstream end of the stem 200. In normal operation, the flag 220 would be wrapped about the stem 200. When the sprinkler head 10 becomes dislodged, and the stem 200 is forced out through the end of the riser pipe 30, the flag 220 would unfurl to provide a better indicator of the absence of the sprinkler head 10.

What is claimed is:

1. A sprinkler outlet with a shut-off valve and alerting system comprising:

(a) a valve seat affixed within a riser pipe upstream from a sprinkler head, said valve seat having an opening;

said riser pipe having a center water inlet portion;

(b) a movable valve element located within said riser pipe upstream from said valve seat, said valve element being moveable between an open position, in which said valve element is spaced apart from said valve seat, and a closed position, in which said valve element engages said valve seat to close said opening and impede fluid from flowing through said riser pipe;

(c) a spring, upstream from said valve element, biasing said valve element toward said valve seat; and (d) a perforated tube extending from said valve element through said opening in said valve seat and contacting said sprinkler head to maintain said valve element in said open position;

wherein said spring moves said valve element downstream into said closed position whenever said sprinkler head becomes dislodged from said riser pipe.

2. The sprinkler outlet of claim 1 wherein said perforated tube extends out from said outlet of said riser pipe whenever said valve element is in said closed position.

3. The sprinkler outlet of claim 2 wherein said perforated tube is brightly colored to act as a marker.

4. The sprinkler outlet of claim 3 further comprising a flag affixed at one end to said perforated tube.

5. The sprinkler outlet of claim 1 wherein said perforated tube is an elongated cylindrical shape with a plurality of openings so as to allow the free flow of water therethrough and unobstructed passage of water into said sprinkler head.

6. A sprinkler outlet with a shut-off valve comprising:

(a) a housing having an inlet and an outlet;

(b) a sprinkler head affixed to said outlet of said housing;

(c) a valve seat affixed within said housing upstream from said sprinkler head, said valve seat having an opening;

(d) a movable valve element located within said housing upstream from said valve seat, said valve element being movable between an open position, in which said valve element is spaced apart from said valve seat, and a closed position, in which said valve element engages said valve seat to close said opening and impede fluid from flowing through said housing;

(e) a spring, upstream from said valve element, biasing said valve element toward said valve seat; and (f) a perforated tube extending from said valve element through said opening in said valve seat and contacting said sprinkler head to maintain said valve element in said open position;

wherein said spring moves said valve element downstream into said closed position whenever said sprinkler head becomes dislodged from said housing.

7. The sprinkler outlet of claim 6 wherein said, perforated tube extends out from said outlet of said housing whenever said valve element is in said closed position.

8. The sprinkler outlet of claim 7 wherein said perforated tube is brightly colored to act as a marker.

9. The sprinkler outlet of claim 8 further comprising a flag affixed at one end to said perforated tube.

10. The sprinkler outlet of claim 6 wherein said perforated tube is an elongated cylindrical shape with a plurality of openings so as to allow the free flow of water therethrough and unobstructed passage of water into said sprinkler head.

11. A sprinkler outlet with a shut-off valve comprising:

(a) a supply pipe;

(b) a T-fitting having a first outlet, a second outlet, and an inlet affixed to the downstream end of said supply pipe;

(c) a cap affixed to said second outlet;

(d) a sprinkler head affixed to said first outlet;

(e) a stationary valve seat disposed within said T-fitting substantially near said first outlet, said valve seat having an opening;

(f) a movable perforated tube disposed within said T-fitting and through said opening, said movable perforated tube having a downstream end and an upstream end, said downstream end contacting said sprinkler head, and said upstream end being sealed;

(g) a shoulder on said perforated tube upstream of said valve seat, said shoulder forming a valve element for engagement with said valve seat; and (h) a compressed spring affixed at one of its ends to said upstream end of said perforated tube and affixed at its other end to said cap, said compressed spring biasing said downstream end of said perforated tube against said sprinkler head;

wherein said spring forces said perforated tube downstream such that said shoulder engages said valve seat to shut off water flow through said first outlet whenever said sprinkler head becomes dislodged from said first outlet.

12. The sprinkler outlet of claim 11 wherein said perforated tube extends out from said first outlet whenever said shoulder engages said valve seat.

13. The sprinkler outlet of claim 12 wherein said perforated tube is brightly colored to act as a marker.

14. The sprinkler outlet of claim 13 further comprising a flag affixed at one end to said perforated tube.

15. The sprinkler outlet of claim 11 wherein said perforated tube is an elongated cylindrical shape with a plurality of openings so as to allow the free flow of water therethrough and unobstructed passage of water into said sprinkler head.

* * * * *